UNITED STATES PATENT OFFICE.

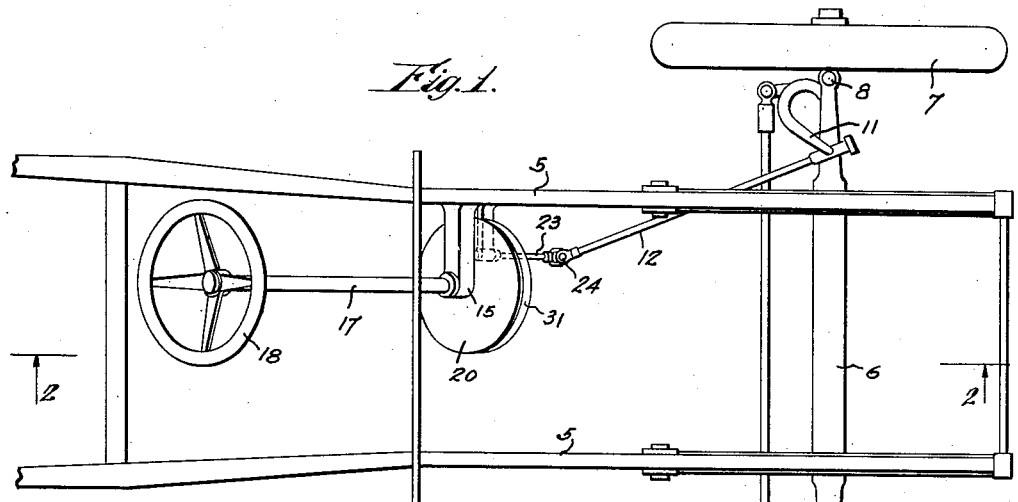
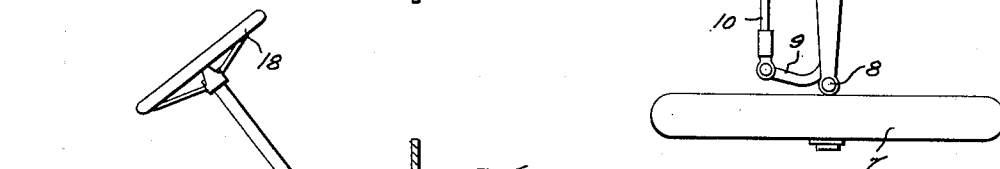
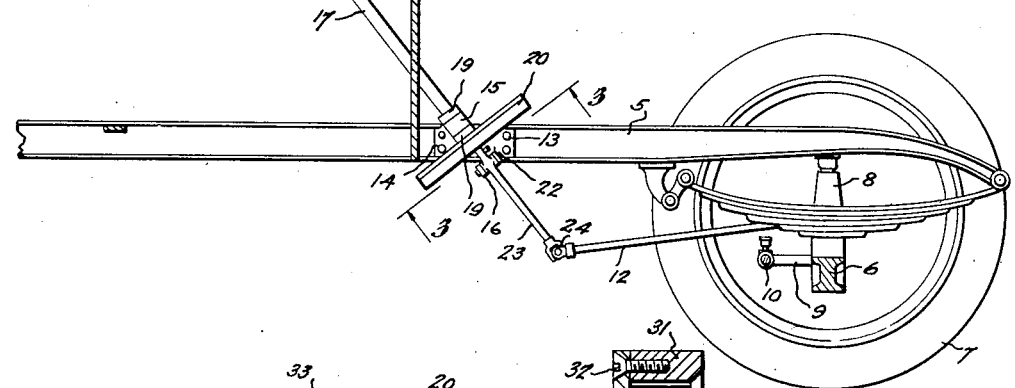
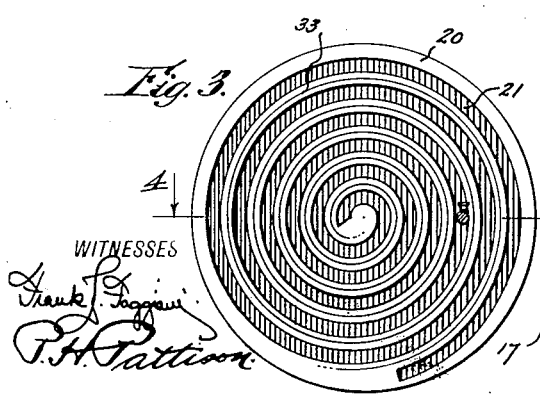
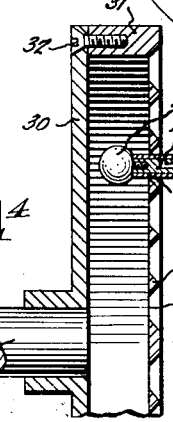

OSWALD S. PULLIAM, OF NEW YORK, N. Y.

STEERING-GEAR.

1,355,570.  Specification of Letters Patent.  Patented Oct. 12, 1920.

Application filed October 3, 1919. Serial No. 328,137.

*To all whom it may concern:*

Be it known that I, OSWALD S. PULLIAM, a citizen of the United States, and a resident of the city of New York, borough of Manhattan, in the county and State of New York, have invented a new and Improved Steering-Gear, of which the following is a full, clear, and exact description.

This invention relates to new and useful improvements in mechanical movements, and it pertains more particularly to a steering mechanism for motor vehicles.

Reference is to be had to the accompanying drawings forming a part of this specification, in which like characters indicate corresponding parts in all of the views, and in which Figure 1 is a top plan view of the forward portion of a motor vehicle chassis showing the improved steering mechanism and its method of attachment to the vehicle;

Fig. 2 is a longitudinal sectional view on the line 2—2 of Fig. 1;

Fig. 3 is a sectional view taken on the line 3—3 of Fig. 2;

Fig. 4 is a sectional view taken on the line 4—4 of Fig. 3.

Referring more particularly to the drawings, the reference character 5 designates the side frames of a motor vehicle chassis, and 6 designates the front axle thereof, to which the steering wheels 7 are attached, as at 8, in the ordinary manner.

Projecting rearwardly from the steering knuckles or pivoted point 8 of the wheels 7, are the drag link arms 9, and said drag link arms 9 are connected by means of a tie bar 10, in the ordinary manner. One of the steering knuckles 8 is provided with a rigidly attached arm 11, to which the drag link 12 is secured. All of this mechanism is of the ordinary type in devices of this character, and it is to a new means for operating this mechanism that the present invention pertains.

Suitably secured to one of the side frames 5, by means of rivets or the like 13, is a bracket 14, and said bracket is provided with an inwardly-extending arm 15. Spaced from the arm 15 and carried by the bracket 14, is a bifurcated arm 16. The bifurcated arm 16 is mounted below and slightly forward of the arm 15.

The steering post 17, which is of the ordinary construction and is provided on its upper end with a hand wheel 18, is rotatably mounted in the arm 15, by means of collars or the like 19. Rigidly carried by the lower end of the steering column 17, is a disk 20, and said disk 20 is provided on its lower face with a continuous spiral groove 21.

Pivotally mounted by means of a bolt or the like 22, in the bifurcated arm 16, is a bell crank lever 23, which lever is connected by means of a universal joint 24, to the rear end of the drag link 12. The upper free end of the bell crank lever 23 is provided with a ball 25, which is removably secured thereto by means of a stem 26. This end of the bell crank lever is provided with a suitable lubricant receptacle, the lubricant of which passes through a passage 28 at the upper end of the bell crank lever 23.

The disk 20 is preferably hollow in form, and consists of a plate 30, to which is secured a continuous annular flange 31, said flange being secured in place by means of bolts or screws 32. Preferably formed integral with the flange 31, are ribs 33, which form the continuous spiral groove 21, and the space between said ribs or width of the spiral groove, is equal to the diameter of the free end of the bell crank lever 23. This bell crank lever 23 is adapted to engage the opposite side edges of the ribs 33. As the disk 20 is rotated by movement toward and away from the center of the disk, the bell crank lever 23 is rocked about its pivot.

From the foregoing, it will be seen that as the bell crank lever 23 is rocked about its pivot, it will move the drag link substantially longitudinally of the vehicle and rock the steering wheels 7 about their pivot points or steering knuckles 8.

Having thus described the invention, what is claimed as new is—

A steering mechanism for vehicles comprising in combination with a drag link for operating the steering wheels, a lever pivoted intermediate of its ends to one of the side frames of the vehicle, a universal joint pivotally connecting the lower end of said lever to said drag link, a steering post, a housing carried by the lower end of said steering post one of the walls of which is provided with a spiral slot adapted to receive the upper end of said pivoted lever whereby upon rotation of said housing the lever is rocked about its pivotal point to operate the drag link, and means carried by the upper end of said pivoted lever to prevent displacement thereof relative to said spiral slot.

OSWALD S. PULLIAM.